(12) United States Patent
Moengen

(10) Patent No.: US 7,898,565 B2
(45) Date of Patent: Mar. 1, 2011

(54) COLLAPSIBLE MULTIMEDIA ENDPOINT

(75) Inventor: Christian Moengen, Aros (NO)

(73) Assignee: Tandberg Telecom AS, Lysaker (NO)

( * ) Notice: Subject to any disclaimer, the term of this patent is extended or adjusted under 35 U.S.C. 154(b) by 1384 days.

(21) Appl. No.: 11/302,523

(22) Filed: Dec. 12, 2005

(65) Prior Publication Data

US 2006/0152894 A1    Jul. 13, 2006

(30) Foreign Application Priority Data

Dec. 15, 2004    (NO) .................................. 20045462

(51) Int. Cl.
*H04N 7/14*    (2006.01)

(52) U.S. Cl. ................ 348/14.08; 348/14.01; 348/14.02; 348/14.09

(58) Field of Classification Search .... 348/14.01–14.08, 348/836–839; 361/679, 724–727; 345/169, 345/905
See application file for complete search history.

(56) References Cited

U.S. PATENT DOCUMENTS

| | | | |
|---|---|---|---|
| 4,808,017 A * | 2/1989 | Sherman et al. | ................ 400/83 |
| 5,500,982 A | 3/1996 | Hosoi | |
| 5,978,211 A | 11/1999 | Hong | |
| 6,081,207 A | 6/2000 | Batio | |
| 6,118,653 A | 9/2000 | Kim | |
| 6,384,811 B1 | 5/2002 | Kung et al. | |
| 2003/0046557 A1 * | 3/2003 | Miller et al. | .................. 713/186 |
| 2003/0137609 A1 | 7/2003 | Hayakawa | |
| 2004/0062000 A1 | 4/2004 | Duarte | |
| 2004/0114319 A1 | 6/2004 | Hill et al. | |
| 2005/0105260 A1 | 5/2005 | Lee | |

FOREIGN PATENT DOCUMENTS

| | | |
|---|---|---|
| DE | 10133470 A1 | 2/2003 |
| EP | 1217501 A2 | 6/2002 |
| EP | 1473908 A1 | 11/2004 |
| JP | 2003198687 A | 7/2003 |
| SE | 512399 C2 | 3/2000 |

OTHER PUBLICATIONS

Mazurek et al. ; Portable Stand Alone Video Telephone System; Jul. 8, 1999; WO 99/34600.*

Godfried T. Toussaint, "Simple Proofs of a Geometric Property of Four-Bar Linkages" 23 pages (Date and Source: Unknown).

* cited by examiner

*Primary Examiner* — Melur Ramakrishnaiah

(74) *Attorney, Agent, or Firm* — Oblon, Spivak, McClelland, Maier & Neustadt, L.L.P.

(57) ABSTRACT

A collapsible multimedia terminal comprising three main sections—a base section, a mid section and a top section, including a screen, a camera, a microphone and a speaker system, wherein the three main sections are joined by revolving joints and that rods are arranged to the top section and the base section to guide the motion of the three sections with respect to each other from a fully collapsed position to a fully extended position.

8 Claims, 2 Drawing Sheets

COLLAPSIBLE MULTIMEDIA ENDPOINT

RELATED APPLICATION

This application claims priority under 35 U.S.C. §119 or 365 to Norwegian Application No. 20045462, filed Dec. 15, 2004. The entire teachings of the above application are incorporated herein by reference.

BACKGROUND

In order to have a meeting involving participants not located in the same area, a number of technological systems are available. These systems may include video conferencing, web conferencing and audio conferencing.

The most realistic substitute for real meetings is high-end video conferencing systems. Conventional video conferencing systems comprise a number of endpoints communicating real-time video, audio and/or data streams over WAN, LAN and/or circuit switched networks. The endpoints include one or more monitors, cameras, microphones and/or data capture devices and a codec, which encodes and decodes outgoing and incoming streams, respectively. In addition, a centralized source, known as a Multipoint Control Unit (MCU), is needed to link the multiple end-points together. The MCU performs this linking by receiving the multimedia signals (audio, video and/or data) from endpoint terminals over point-to-point connections, processing the received signals, and retransmitting the processed signals to selected endpoint terminals in the conference.

In all video conferencing systems it is crucial that eye contact between the users is as natural as possible. This can be achieved if the screen and camera are placed close together and at a natural straight ahead view angle. The challenge arises in designing a compact collapsible videoconferencing system, and the need for such a product increases as the wireless technology emerges. It is important to keep the system simple to operate for the user.

The problem with a regular format laptop type videoconferencing system is that the screen and camera would be positioned too low for a straight ahead view angle. The person at the opposite end will experience that he or she is being looked down at. The system could of course be placed on top of a stack of books, but this is not a practical solution. One alternative way to alleviate this problem is to make a laptop that is longer than normal, but this would not be as compact and it would probably take up more desk space. Another alternative is to make a regular laptop format system, but have the possibility of sliding the screen and camera up after opening the lid. This would require two operations to get the system up and would be too laborious for most people.

There are several different desktop videoconferencing systems on the market, but none of these are collapsible. No laptop computers using a similar solution to elevate the screen are known.

SUMMARY

The present invention discloses a portable and collapsible multimedia terminal.

The aim of the invention is to provide a compact expandable/collapsible multimedia terminal for a video conferencing system or a personal computer, using a four bar linkage to elevate the screen and camera.

One object of the invention is to provide a multimedia terminal which is collapsible, and which can be activated by one hand to bring the unit from a collapsed position to an operating position. The transformation is done by one single controlled motion that makes it very easy for the user to expand and collapse the system.

Another object of the invention is to bring forward a compact laptop multimedia terminal that can be expanded into a full size, full height desktop system. The transformation is done by one single controlled motion that makes it very easy for the user to expand and collapse the system.

The objects of the invention are met by a compact expandable multimedia terminal as defined in the enclosed independent claim.

Preferred embodiments and alternative features are defined in the dependent claims.

BRIEF DESCRIPTION OF THE DRAWINGS

The present invention will be described in detail with reference to a preferred embodiment as shown in the following drawings.

DETAILED DESCRIPTION

Figure 1:
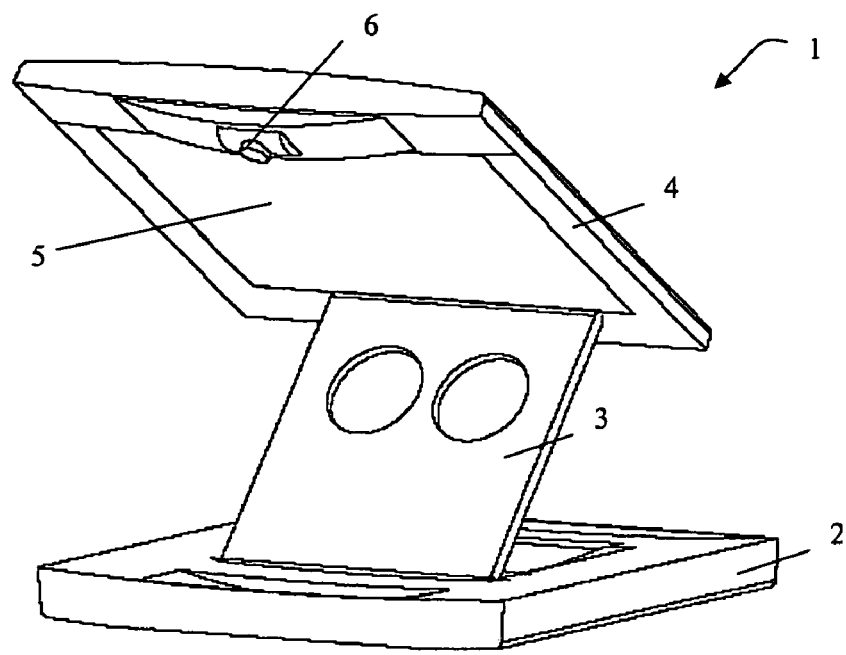
FIG. 1 is a perspective view of the multimedia terminal according to the invention in a partially collapsed position.
Figure 2:
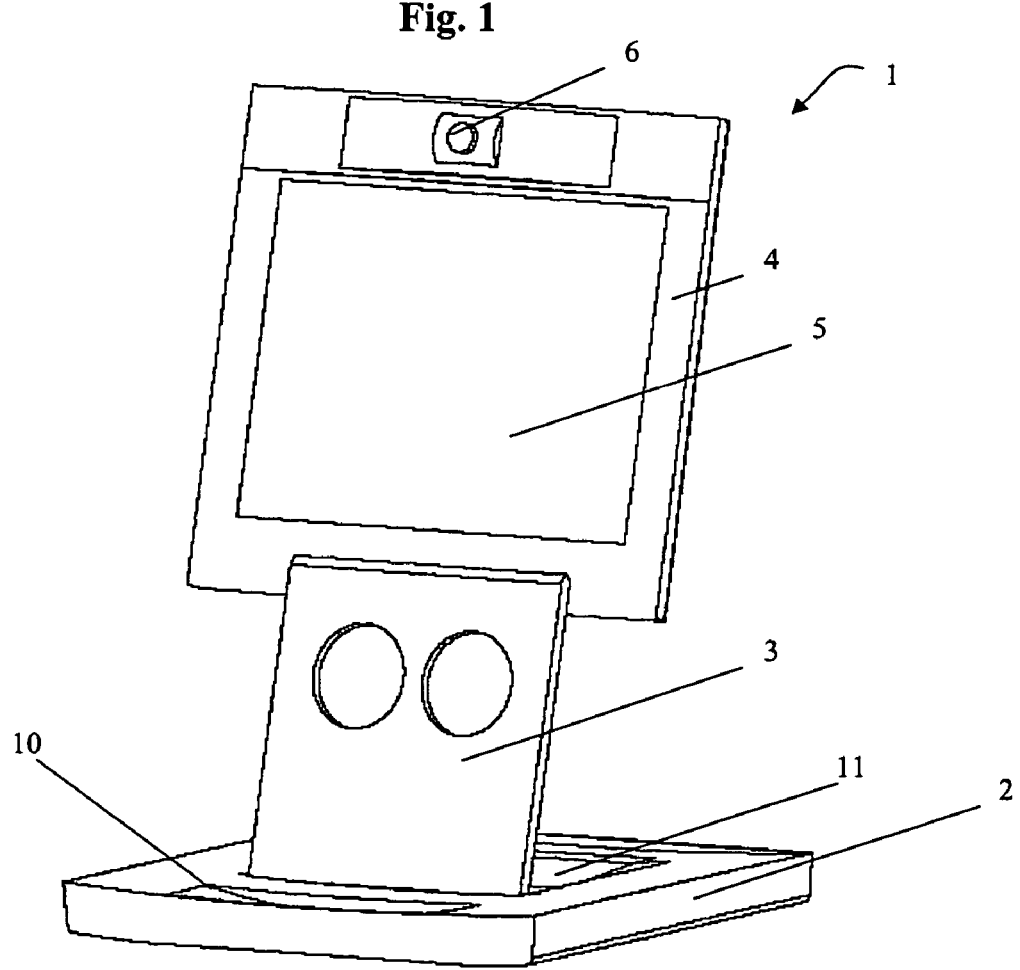
FIG. 2 is a perspective view of the invention in a totally expanded position.
Figure 3:
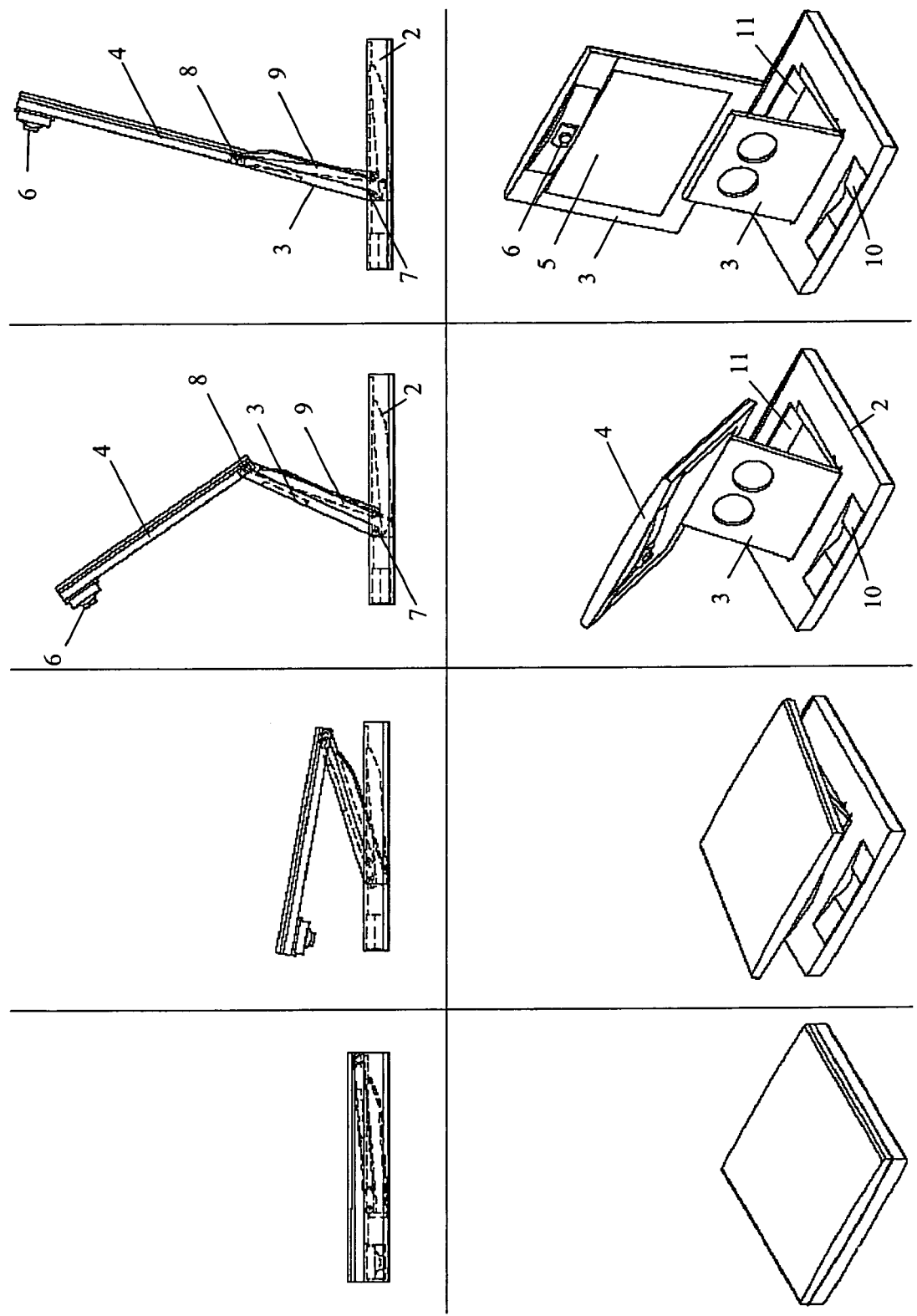
FIG. 3 shows different positions of the collapsible multimedia terminal in corresponding side-views and perspectives.

Referring to FIGS. 1-3, an end point 1 in a video conference system according to the present invention comprises three main modules; a base 2 including the coder/decoder (codec), a mid-section 3 that may include speakers, and a top-section 4 including a screen 5 and a camera 6.

In order to obtain sufficient screen and camera height when the system is expanded, these are placed on top of the mid-section. All three modules are joined together with revolving joints 7, 8 (FIG. 3). Normally the three modules would now be free to rotate independently of each other. To better control the motion of each module, an extra link 9 with revolving joints is placed between the base 2 and the top 4. The resulting mechanism is commonly known as a four bar linkage.

In the embodiment shown the top 4 and the mid section 3 forms a straight line when the unit 1 is expanded. There is no need for additional support other than the four bar linkage and the friction in the revolving joints 7, 8, and/or and end stop in the base for the bar linkage. However, additional supports may be provided, for example, by sliding rods connected to the screen and the base which are positioned at an angle between the screen and the rear part of the base.

The base may be provided with grooves 10, 11 to accommodate protruding parts of the top and mid-section, such as speakers, camera and in- and outputs. These grooves are shown in the side views in FIG. 3 in phantom lines and in the corresponding perspective views.

After the system 1 is fully expanded it can be locked in this position by e.g. the abovementioned end stop. However, locking is not necessary as the friction of the joints 7, 8 or additional springs should be sufficient to maintain the system in position. In a fully expanded position the main components of the video conferencing system are optimally positioned with respect to direction and height. This is an important and advantageous feature of the invention compared to prior art lap-top solutions.

In an alternative embodiment a keyboard can be included in the system together with a personal computer. The keyboard can be arranged to be folded under the base, or be slidingly and/or tiltably connected to the base for easy access.

The operation of the system can be motorized. An electrical motor can be provided to collapse and/or expand the system.

The invention involves the concept of using a four bar linkage in order to elevate the screen 5 and camera 6 in conjunction with collapsible videoconferencing systems and personal computers.

The invention has no size restrictions. The mechanism can be scaled to work for small as well as large components. It is possible to spring load and dampen the joints of the mechanism to make the systems easier to open and close. The system can be made to be completely wireless or with wire connections.

The invention makes it possible to have a compact laptop format video conferencing system that can be expanded into a full size, full height desk top system. The transformation is done by one single controlled motion that makes it very easy for the user to expand and collapse the system.

While this invention has been particularly shown and described with references to preferred embodiments thereof, it will be understood by those skilled in the art that various changes in form and details may be made therein without departing from the scope of the invention encompassed by the appended claims.

What is claimed is:

1. A collapsible multimedia terminal comprising:
    a base section;
    a middle section coupled to the base section by a first revolving joint;
    a top section coupled to the middle section by a second revolving joint,
    wherein the top section includes a screen and a camera disposed above the screen, and the middle section includes a speaker; and
    a rod coupled to the top section by a third revolving joint and to the base section by a fourth revolving joint,
    wherein said rod, base section, middle section, and top section form a four bar linkage that guides movement of the base section, middle section, and top section with respect to each other from a fully collapsed position to a fully extended position.

2. The collapsible multimedia terminal according to claim 1, further comprising a spring that dampens at least one of the first, second, third, or fourth revolving joints.

3. The collapsible multimedia terminal according to claim 1, wherein the top section or the middle section includes a protruding part, and the base section includes a groove that accommodates the protruding part.

4. The collapsible multimedia terminal according to claim 1, further comprising means for locking the multimedia terminal in at least one of a collapsed or extended position.

5. The collapsible multimedia terminal according to claim 1, wherein the base section includes an extractable or foldable keyboard.

6. The collapsible multimedia terminal according to claim 1, wherein the multimedia terminal is a portable video conference endpoint.

7. The collapsible multimedia terminal according to claim 1, further comprising means for dampening at least one of the first, second, third, or fourth revolving joints.

8. The collapsible multimedia terminal according to claim 1, further comprising a locking unit that locks the multimedia terminal in at least one of a collapsed or extended position.

* * * * *